Sept. 1, 1964  A. G. FORD  3,146,752
CAPTURED AIR BUBBLE VEHICLE
Filed Aug. 28, 1962
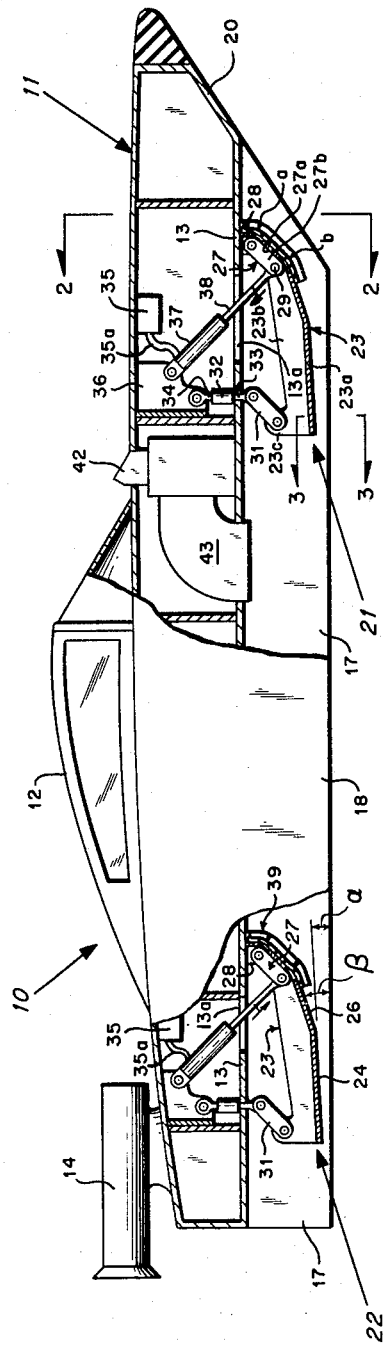
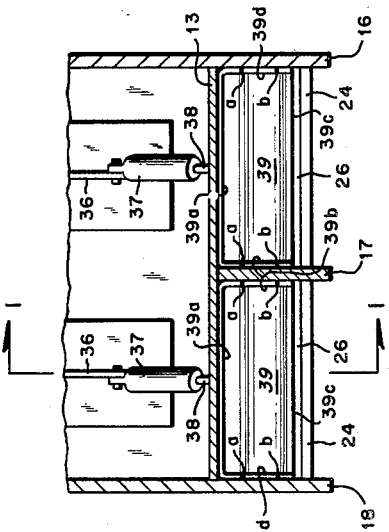
Fig. 2
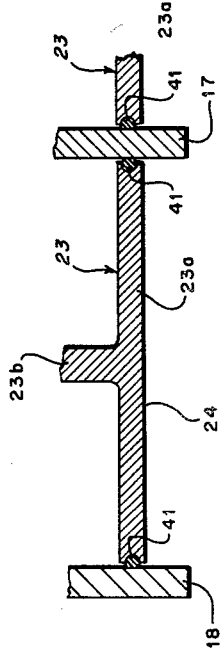
Fig. 3
INVENTOR.
ALLEN G. FORD
BY
*Henry Hansen*
ATTORNEY 3,146,752
       CAPTURED AIR BUBBLE VEHICLE
Allen G. Ford, 3560 Mill Road, Hatboro, Pa.
     Filed Aug. 28, 1962, Ser. No. 220,104
             9 Claims. (Cl. 114—67)
  (Granted under Title 35, U.S. Code (1952), sec. 266)

The invention described herein may be manufactured and used by or for the Government of the United States of America for governmental purposes without the payment of any royalties thereon or therefor.

The present invention relates to an over-water vehicle and more particularly to a captured air bubble water vehicle designed to attain high speeds with reasonably small power consumption and to have a capability of traveling in open sea conditions.

Various types of high speed over-water vehicles of recent development are in use today. These over-water vehicles include the hydrofoil boat, the ground effect machine, also called the hydro skimmer or hover craft, and the planing craft. All of these over-water vehicles in some degree improve over the conventional displacement hull type of vehicle. Displacement hull type vehicles all have a sharp drag rise which is proportional to velocity raised to the fourth power. This sharp drag rise of displacement hull type vehicles has always limited the speeds at which the displacement hull type vehicles could be efficiently operated.

Planing hull and hydrofoil type boats each may operate at high speeds but their relative efficiencies are only moderate and each suffers from concentrated loads in that there is relatively small area over which to distribute the weight.

The ground effects machine, which has the advantage of attaining most of its lift from a pressurized region of air between the machine, does provide low friction between the air base and the water. However, a large amount of power is necessary to maintain the vehicle at an operable level.

The present invention contemplates an over-water vehicle wherein a pressurized air bubble is sealed between the vehicle and the water. The maximum air retention within the pressurized region between the vehicle and the water is maintained by a pair of thin sideboards and a ski assembly fore and aft which together with the sideboards afford a substantially airtight-watertight airspace between water and vehicle. The configuration of the sideboards and the fore and aft ski assemblies with their particular planing surfaces minimize the amount of air which must be resupplied to the pressurized area between the vehicle and the water to maintain the vehicle supported. The unique structural arrangement of the captured air bubble vehicle and particularly the small angle of attack planing surfaces of the ski assemblies provide an over-water vehicle which is highly efficient at very high speeds and wherein a high sea keeping capability is obtained. While the planing surfaces accept a small portion of the vehicle weight, the major portion of the captured air bubble vehicle weight is taken up by the bubble of air captured between the vehicle and the water. The small angle of attack planing surfaces by virtue of their special configuration provide a very favorable drag-to-lift ratio at all speeds even under open sea conditions. From small speeds on up, a stagnation point pressure larger than the base bubble pressure is built up under the planing surfaces to prevent the escape of air from the pressurized bubble region above the water surface. Since only a very small amount of air entrained in the water escapes, the vehicle of the present invention requires only a very small resupply of air.

Specifically, the present invention relates to a captured air bubble vehicle wherein the planing surfaces are of such a configuration that the angle between the planing surface and the water remains small and constant regardless of speed of the vehicle or the particular sea state. The low angle of attack planing surface which is highly desirous for its low drag characteristic has been shown to be a solution to the problem of retention of full positive pressure at high speed for a reasonably low resupply of air. By low resupply of air is meant that the power required for air resupply to the airspace is very small compared to vehicle thrust power.

It is an object of the present invention to provide an over-water vehicle capable of operating efficiently at high speeds under open sea conditions.

Another object of the present invention is to provide an over-water vehicle which has a very favorable drag-to-lift ratio at speeds which vary from low to high relative to the drag-to-lift conventional watercraft.

A further object of the present invention is to provide a captured air bubble over-water vehicle wherein the lift power of the supporting pressurized air bubble is maximized while the power necessary to provide the pressurized air bubble is minimized compared to the vehicle thrust power.

Another object of the present invention is to provide an over-water vehicle having a configuration which provides extremely low drag characteristics while at the same time eliminates the problem of negative pressure at all speeds.

A still further object of the present invention is to provide an over-water vehicle wherein a low angle of attack is maintained of the fore and aft planing surfaces and the water without undue increase in drag.

Yet another object of the present invention is to provide an over-water vehicle wherein the particular configuration of the fore and aft planing surfaces provides efficient and smooth operation of the vehicle in open seas.

Other objects and many of the attendant advantages of this invention will be readily appreciated as the same become better understood by reference to the following detailed description when considered in connection with the accompanying drawing in which like reference numerals designate like parts through the figures thereof and wherein:

FIG. 1 shows an elevation view of a preferred embodiment of the invention with the sectioned portion taken along lines 1—1 of FIG. 2;

FIG. 2 is a sectional view of the vehicle taken along lines 2—2 of FIG. 1; and

FIG. 3 is a sectional view of the planing surface sealing arrangement taken along lines 3—3 of FIG. 1.

Referring now to FIG. 1, there is shown an over-water vehicle 10 of general boat shape configuration comprising a hull 11 which has situated thereon a passenger compartment 12. A flat bottom wall 13 of any convenient material such as aluminum or plywood covers the entire underneath of the hull section. An engine 14 of the jet type secured near the aft portion of the vehicle is used for the forward propulsion of the boat through the water. Alternately, a conventional internal combustion type engine for powering a screw or propellor beneath the water may be used for propulsion.

Sideboards 16 and 18 which are shown as integral with the outer bulkheads of hull 11 extend the entire length of the vehicle. The sideboards 16 and 18 are streamlined at the forward end of the boat so as to conform to the outer contour 20 of the bow section of the hull 11. The distance sideboards 16 and 18 extend downwardly from the bottom wall 13 is a matter of design but for purposes of clarity may be thought of as being $\frac{1}{13}$ of the length of the sideboards. A centerboard 17 which has the same configuration and length as sideboards 16 and 18 is affixed to bottom wall 13 in any convenient manner and has the purpose of aiding in lateral stability of the vehicle. Sideboards 16 and 18, together with centerboard 17, form two longitudinal airspaces along the underside of the vehicle.

Situated near the ends of each of the airspaces formed by sideboards 16 and 18 and centerboard 17 is a ski assembly. Two of these ski assemblies 21 and 22 are visible in FIG. 1. Since the structural arrangement of these ski assemblies are identical, only ski assembly 21 will be discussed in detail.

Ski assembly 21 comprises a ski 23 of inverted T-shaped configuration as best seen in FIG. 3. Ski 23 comprises upright member 23b and crosspiece member 23a which form planing surface 24 which makes a small, acute angle $\alpha$ with the horizontal and planing surface 26 which makes a relatively larger, acute angle $\beta$ with the horizontal. As shown in FIG. 3 the width of crosspiece member 23a is substantially equal to the distance between one of sideboards 16 or 18 and centerboard 17.

Mechanical linkage 27 is also of inverted T-shaped configuration with a crosspiece member 27a and an upright member 27b. One end of mechanical linkage 27 is pivotally connected to ear 28 which is rigidly secured to bottom wall 13 in any convenient manner. The other end of mechanical linkage 27 is pivotally connected to the upright portion 23b of ski 23 by a pin 29.

Mechanical linkage 31 is pivotally connected at one end to ear 23c of ski 23. The other end of mechanical linkage 31 is pivotally connected to rod 33 of turnbuckle 32. Rod 34 of turnbuckle 32 is rigidly connected to member 36 which is rigidly secured to hull 11 in any convenient manner. As may be seen from the drawing turnbuckle 32 is nonrotatable with respect to hull 11. By turning turnbuckle 32 the point at which mechanical linkage 31 is pivotally connected to rod 33 may be raised or lowered thereby providing a means for increasing or decreasing the angle $\alpha$. Obviously a turnbuckle may be chosen to provide a wide range of variance for the angle $\alpha$.

By virtue of the manner in which ski 23 is connected to hull 11, it is seen that ski 23 is rotatable about a fixed point and, therefore, is movable up and down with respect to hull 11 without changing the angle $\alpha$ which planing surface 24 makes with the horizontal. The angle $\beta$ which is not critical also remains fixed although ski 23 moves up and down.

When the vehicle is in the water, the angle $\alpha$ at all but very low speeds is the angle of attack that planing surface 24 makes with the water surface. At very low speeds the angle $\beta$ is the angle of attack since planing surface 26 is the surface that is meeting the surface of the water. Therefore, a low angle of attack $\alpha$ is provided with its very low drag at all but very low speeds. In addition, planing surface 26 is provided with its angle of attack for low speed operation. As soon as the speed of the vehicle passes a low minimum point, planing surface 24 becomes the only one wetted. Thus, transition from one planing surface to the other takes place long before drag (which increases with speed) becomes a problem.

A pneumatic spring comprising piston cylinder 37 and piston rod 38 which is movable in the longitudinal direction with respect to piston cylinder 37 provides variable damping of the ski 23 which enables it to move up and down in response to oncoming sea waves transmitting only a small movement to the vehicle body. The pneumatic spring is of conventional design, is commercially available and includes an accumulator 35 associated therewith which supplies air under pressure through 35a to the piston cylinder 37. By providing a variable size fluid chamber in piston chamber 37 the spring constant may be varied or adjusted according to the existing sea conditions. The end of piston rod 38 is connected to ski 23 by pin 29. The end of piston cylinder 37 is pivotally connected to member 36 as shown. The forward pneumatic spring acts in cooperation with accumulator 35 to cause the piston rod 38 to move upwardly in the direction of the arrows shown in FIG. 1 and to thereby urge the forward ski 23 toward the hull 11 of the vehicle 10 in opposition to the captured air bubble pressure tending to urge the forward ski 23 away from the hull 11.

The rear pneumatic cylinder also cooperates with the accumulator 35 to cause the piston rod 38 to move in a downwardly direction as indicated by the arrow in FIG. 1 to urge the rear ski 23 away from the hull 11 of the vehicle 10 and against the pressurized air tending to urge the ski toward the hull 11. In order to permit longitudinal movement of the pneumatic spring, a small longitudinally extending sealed slot 13a is formed in the bottom wall 13 of the hull of the vehicle.

A relatively thick sheet of flexible material 39, which may be rubberized or otherwise waterproofed, is bonded to the crosspiece member 27a of mechanical linkage 27. The edges 39a and 39c of sheet 39 slightly overlap and are bonded to bottom wall 13 and planing surface 26, respectively, forming substantially airtight-watertight seals therewith. The edges 39b and 39d overlap centerboard 17 and sideboad 16, respectively, and are in abutting, rubbing relationship thereto. The edges 39b and 39d are slit as at $a$ and $b$ shown in FIGS. 1 and 2 to allow for flexing of sheet 39 caused by the up and down rotational movement of ski 23 in response to oncoming waves impinging on planing surfaces 24 and 26.

A length 41 of O-ring material, circular in cross section, as shown in FIG. 3, is secured along each of the edges of crosspiece member 23a adjacent the sideboard 18 and centerboard 17. This length of O-ring material may be mounted along the described edges in any convenient manner such as bonding within a semi-circular groove in the particular edges much as shown in FIG. 3. Since the edges of crosspiece member 23a of the ski 23 are in adjacent relationship to sideboard 16 and centerboard 17, the strip 41 of O-ring material is in compressed, abutting relationship thereto. Thus, when the ski assembly 23 raises and lowers according to the wave condition of the sea, the length of O-ring material will maintain a substantially air tight and watertight seal between sideboard 18 and centerboard 17 extending to the lowest point at which planing surface 26 is riding on the water surface.

As aforesaid the forward end of the vehicle has a ski assembly as just described on each side of centerboard 17 both fore and aft of the vehicle. The sealing arrangement of these four ski assemblies, together with sideboards 16 and 18 and centerboard 17, form two airtight compartments along the underside of the vehicle. An air pump having a duct 42 communicating with the atmosphere and a duct 43 communicating with each airspace provides the air for initial buildup of the air bubbles under the vehicle and also resupplies the small amount of air which may escape when the vehicle is underway.

Since the centerboard 17 is added to increase lateral stability, removal of it and use of only one assembly fore and one aft identical in configuration to the one described but twice as wide would not detrimentally affect the basic principle of operation of the present invention.

In operation, when the over-water vehicle of the present invention is at rest in the water with no forward motion the bottom wall 13 supports the vehicle. At very low speeds, after a bubble has been formed within the airspaces between the vehicle and the water, the vehicle raises up. However, at these low speeds planing surface 26 is being wetted and although the lift-to-drag ratio of the vehicle is much better than that of the conventional water vehicle, the efficiency at this speed is lower than at speeds which range from moderate to very high where the planing surface 24 is the only one wetted.

Since the amount of resupply air at a given speed is a distinct function of rear planing surface geometry, the problem of negative pressure being created within the supporting air compartments exists in many conventional over-water vehicles particularly at high speed. However, due to the low angle of attack of the planing surfaces of the present invention this problem is eliminated. The ability of the fore and aft skis to move up and down in response to the wave condition of the sea transmitting only a small amount of such movement to the vehicle and without changing the angle of attack of the planing surfaces provides a high degree of sea capability without loss of efficiency or decrease in the lift-to-drag ratio with its attendant increase in power loss.

Obviously many modifications and variations of the present invention are possible in the light of the above teachings. It is therefore to be understood that, within the scope of the appended claims, the invention may be practiced otherwise than as specifically described.

What is claimed is:

1. An over-water vehicle comprising in combination:
    a hull,
    sideboard means on each side of said hull extending downwardly away from said hull,
    planing surface means mounted fore and aft of said hull intermediate said sideboard means and maintaining a small acute angle of attack with respect to the water, said planing surface means extending entirely beneath said hull and movable up and down with respect to said hull,
    each of said planing surface means engaging the water surface and being sealed with respect to said hull and said sideboard means thereby forming a longitudinal air space therebetween and sealing a pressurized air bubble between the vehicle and the water,
    first spring means mounted between said hull and said forward planing surface means for damping the up and down movement of said planing surface means and for urging said planing surface means toward said hull,
    and second spring means mounted between said hull and said rearward planing surface means for damping the up and down movement of said planing surface means and for urging said planing surface means away from said hull.

2. The over-water vehicle as defined in claim 1, and including:
    motor means mounted rearwardly on said hull for propelling the vehicle through the water,
    centerboard means attached to said hull and extending downwardly away from said hull,
    said planing surface means being further positioned intermediate said sideboard means and said centerboard means and being sealed with respect to said hull, sideboard means and centerboard means thereby forming a longitudinal air space therebetween,
    air pump means mounted on said hull,
    and duct means communicatively connected between said air pump means and said air space for supplying air from said air pump means to said air space.

3. An over-water vehicle as defined in claim 1, and wherein said sideboard means extends the length of said hull and forms an air space extending the length of the underside of said hull.

4. An over-water vehicle as defined in claim 1, and including:
    first linkage means pivotally connecting the forward end of each of said planing surface means to said hull,
    and second linkage means pivotally connecting the rearward end of each of said planing surface means to said hull.

5. An over-water vehicle as defined in claim 2, and including:
    first linkage means pivotally connecting the forward end of each of said planing surface means to said hull,
    and second linkage means pivotally connecting the rearward end of each of said planing surface means to said hull.

6. The over-water vehicle as defined in claim 2 wherein said centerboard means attached to said hull forms with said sideboard means two air spaces extending the length of the underside of said hull,
    and said planing surface means is located at each end of each air space thereby sealing two pressurized air bubbles between the vehicle and the water.

7. The over-water vehicle as defined in claim 5 wherein the seal between said planing surface means and said hull and said sideboard means comprises:
    a rectangular flexible sheet of waterproof material adjacent said first mechanical linkage forming airtight seals between said hull, said planing surface and said sideboard means,
    strips of rubber of circular cross section rigidly fixed along the edges of said planing surface means adjacent said sideboard means and in rubbing relationship thereto forming therewith an airtight-watertight seal.

8. The over-water vehicle as defined in claim 4 wherein said second linkage means includes:
    turnbuckle means interposed between said hull and said planing surface means for retracting or extending said planing surface means toward or away from said hull to thereby vary the angle said planing surface makes with the horizontal.

9. The over-water vehicle as defined in claim 5 wherein said second linkage means includes:
    turnbuckle means interposed between said hull and said planing surface means for retracting or extending said planing surface means toward or away from said hull to thereby vary the angle said planing surface makes with the horizontal.

References Cited in the file of this patent

UNITED STATES PATENTS

| | | |
|---|---|---|
| 1,003,364 | Langston | Sept. 12, 1911 |
| 1,070,878 | Dinesen | Aug. 19, 1913 |
| 1,819,216 | Warner | Aug. 18, 1931 |
| 1,868,054 | Easthope | July 19, 1932 |
| 2,708,894 | Hook | May 24, 1955 |
| 2,753,135 | Gouge | July 3, 1956 |
| 3,016,864 | Woodfield | Jan. 16, 1962 |
| 3,027,860 | Priest | Apr. 3, 1962 |

FOREIGN PATENTS

| | | |
|---|---|---|
| 249,957 | Italy | Aug. 26, 1926 |
| 492,046 | Great Britain | Sept. 14, 1938 |
| 1,162,685 | France | Apr. 14, 1958 |